(12) United States Patent
Kansara

(10) Patent No.: US 10,572,767 B2
(45) Date of Patent: Feb. 25, 2020

(54) SCENE AND SHOT DETECTION AND CHARACTERIZATION

(71) Applicant: NETFLIX, Inc., Los Gatos, CA (US)

(72) Inventor: Apurvakumar D. Kansara, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 39 days.

(21) Appl. No.: 15/486,108

(22) Filed: Apr. 12, 2017

(65) Prior Publication Data

US 2018/0300554 A1    Oct. 18, 2018

(51) Int. Cl.
*G06K 9/62* (2006.01)
*H04N 21/8549* (2011.01)
*H04N 21/84* (2011.01)
*G06K 9/00* (2006.01)
*H04N 21/845* (2011.01)
*H04N 21/234* (2011.01)
*G06F 16/738* (2019.01)

(52) U.S. Cl.
CPC ......... *G06K 9/6215* (2013.01); *G06F 16/739* (2019.01); *G06K 9/00228* (2013.01); *G06K 9/00744* (2013.01); *H04N 21/23418* (2013.01); *H04N 21/84* (2013.01); *H04N 21/8456* (2013.01); *H04N 21/8549* (2013.01)

(58) Field of Classification Search
None
See application file for complete search history.

(56) References Cited

U.S. PATENT DOCUMENTS

| | | | |
|---|---|---|---|
| 6,754,389 B1* | 6/2004 | Dimitrova | G06K 9/00228 382/224 |
| 9,436,876 B1* | 9/2016 | Carlson | G06K 9/6224 |
| 2013/0019257 A1* | 1/2013 | Tschernutter | H04N 21/234309 725/4 |
| 2014/0259056 A1* | 9/2014 | Grusd | H04N 21/8583 725/34 |
| 2016/0306797 A1* | 10/2016 | Taboriskiy | G06F 17/30026 |

* cited by examiner

*Primary Examiner* — Chan S Park
*Assistant Examiner* — Elisa M Rice
(74) *Attorney, Agent, or Firm* — FisherBroyles, LLP

(57) ABSTRACT

A method includes receiving, with a computing system, a video item. The method further includes identifying a first set of features within a first frame of the video item. The method further includes identifying, with the computing system, a second set of features within a second frame of the video item, the second frame being subsequent to the first frame. The method further includes determining, with the computing system, differences between the first set of features and the second set of features. The method further includes assigning a clip category to a clip extending between the first frame and the second frame based on the differences.

20 Claims, 6 Drawing Sheets

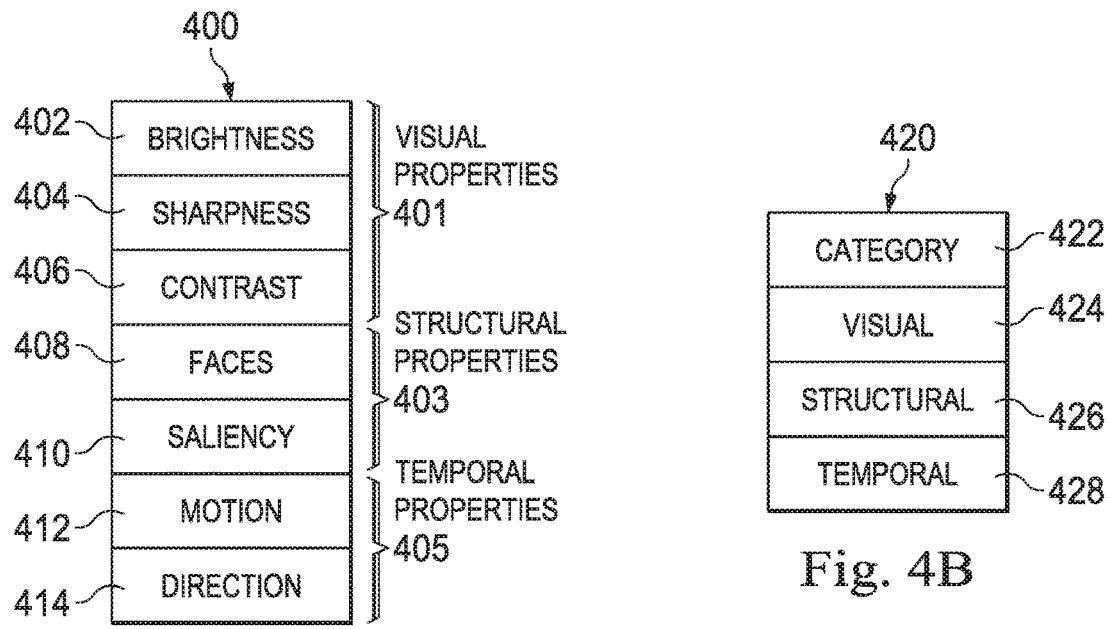
Fig. 4A
Fig. 4B
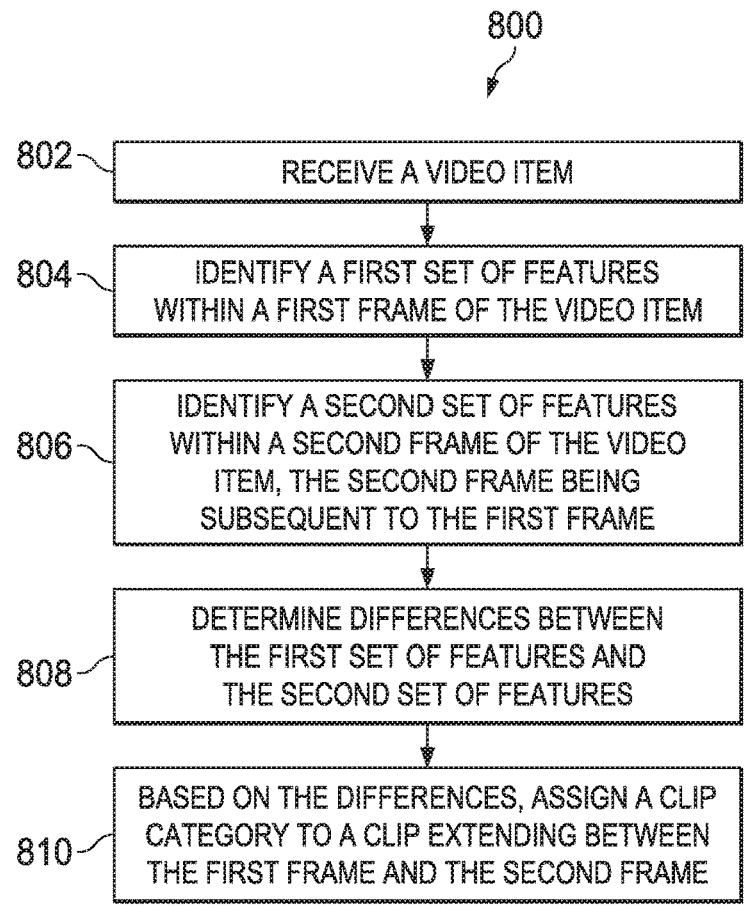
Fig. 8

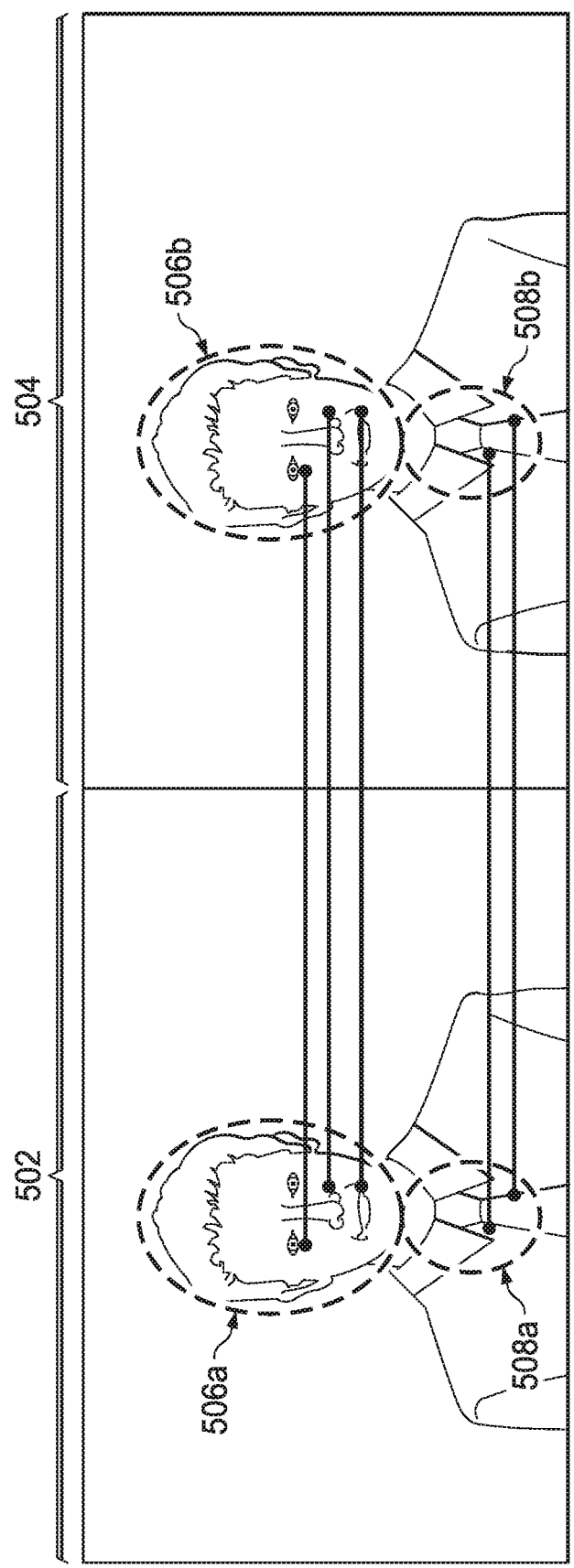

SCENE AND SHOT DETECTION AND CHARACTERIZATION

TECHNICAL FIELD

The present disclosure relates generally to analysis of video content, and more particularly, to analysis of video content to automatically derive segments and still images for use in representational materials.

BACKGROUND

While consumers may access media items, such as movies and television shows, by receiving over the air signals or by subscribing to a cable or satellite television provider, increasingly consumers are accessing content over Internet-based systems. Some Internet-based systems allow users to download or stream content over the Internet to a variety of client devices. For example, an Internet-based media system may provide content to users via a personal computer, a set-top box, or a personal mobile device, such as a smart phone or tablet computer. In particular, streaming media systems enable users to access media content in a stream, such that the users may begin consuming (e.g., watching and/or listening to) content before the entirety of the content is delivered to a given user's client device. Such a system allows users to access content while avoiding a potentially lengthy download process before beginning to consume their selected content.

Media content providers, as well as media content producers, often work with a large amount of content. For example, a media content provider may provide hundreds of thousands of movies, television episodes, or other types of video content to consumers. With such a vast library of content, media consumers may wish to efficiently represent such content to consumers who are browsing the library of content. For example, as consumers look at various titles, they may be provided with a brief movie trailer or a slideshow of cut-scenes from the movie. Creating such trailers or slideshows for hundreds of thousands of titles can require a large amount of resources. Even on a smaller scale, a content producer may record a large amount of footage, only a fraction of which will be used in the final piece. It would be desirable to have methods and systems that can efficiently analyze, detect, and characterize scenes within media items to help media providers create representational content such as trailers and slideshows, or to help media producers find ideal footage for a final product.

BRIEF DESCRIPTION OF THE DRAWINGS

FIGS. 4A and 4B are tables showing various metadata that may be assigned to detected representational features, according to some embodiments of the present disclosure.

FIG. 5 is a diagram showing detection of features indicating a close-up shot, according to some embodiments of the present disclosure.

FIG. 8 is a flowchart showing an illustrative method for detecting representational features within a video item, according to some embodiments of the present disclosure.

Figure 1:
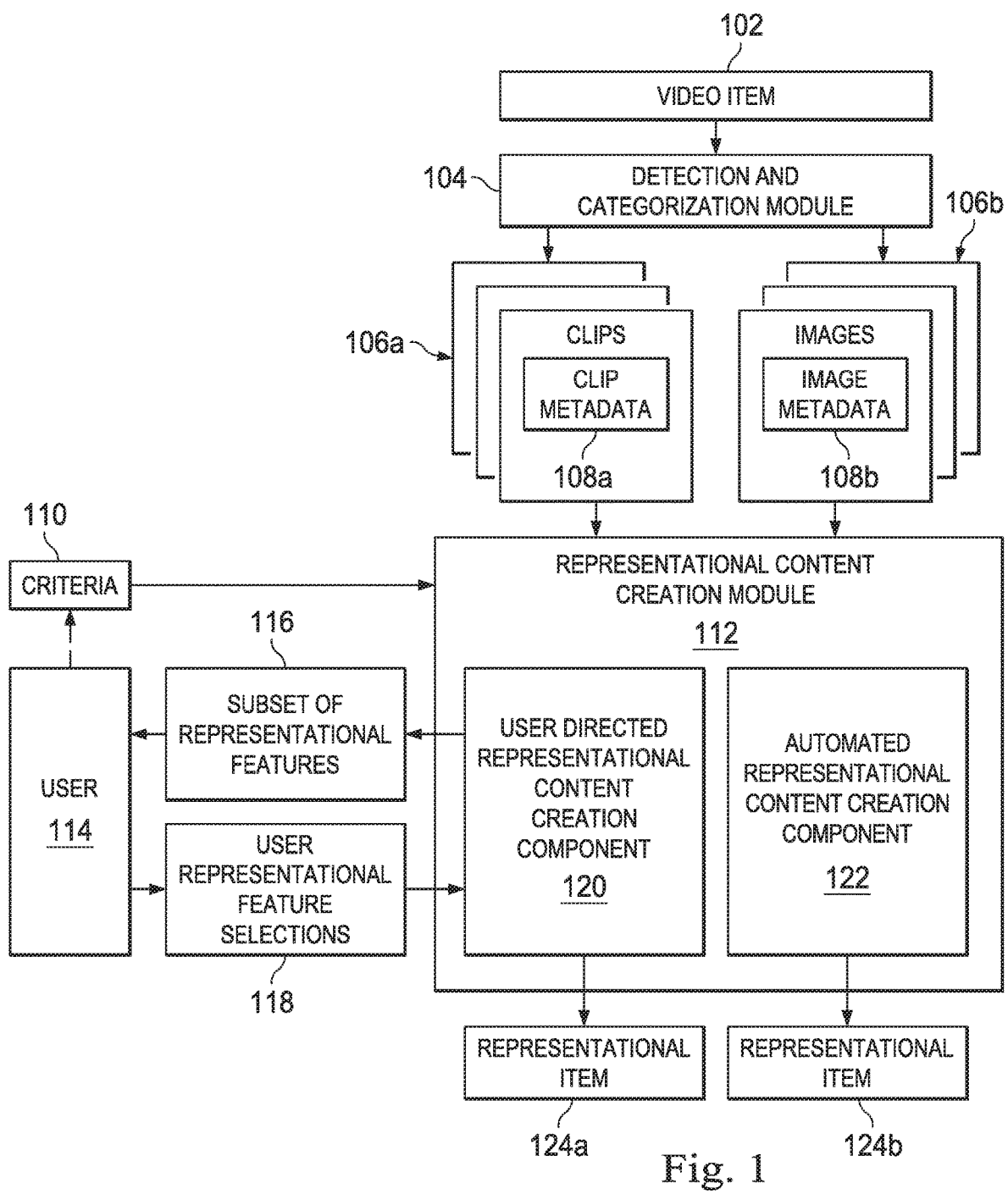
FIG. 1 is a block diagram of a representational feature detection and categorization system, according to some embodiments of the present disclosure.

These drawings will be better understood by those of ordinary skill in the art by reference to the following detailed description.

DETAILED DESCRIPTION

With reference to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, well-known process steps have not been described in detail in order to avoid unnecessarily obscuring the present disclosure. Additionally, other applications of the concepts and principles described herein are possible, such that the following examples should not be taken as limiting. For example, while many of the examples disclosed herein are directed to streaming media, the principles and concepts described may be applied to provide representational content in a system that additionally or alternatively provides media items for consumption in other manners, such as purchase, rental, download, etc.

In the following detailed description, references are made to the accompanying drawings, which form a part of the description and in which are shown, by way of illustration, specific embodiments of the present disclosure. Although these embodiments are described in sufficient detail to enable one skilled in the art to practice the invention, it is understood that these examples are not limiting, such that other embodiments may be used, and changes may be made without departing from the spirit and scope of the invention.

As described above, it would be desirable to minimize the amount of resources expended to review and classify content for various purposes such as representational content creation or for content production. According to principles described herein, libraries of media content, which may include collections of production footage, are analyzed and categorized using various functions that will be described in more detail below. Specifically, the media content may be separated into various clips, or portions of the video, that correspond to different scenes or different shots. Based on the characteristics of those scenes and shots, the clips may be assigned a category or tagged with specific metadata.

The detection and categorization of various clips within large amounts of media content may be used for a variety of purposes. For example, the detection and categorization processes described herein may be used when identifying content for representational materials such as trailers or slideshows. In one example, it may be desired to create a trailer with images having specific characteristics. Thus, the clips and still images having such characteristics can quickly be determined based on the detection and categorization processes that have been performed. Specifically, for a particular piece of content, a set of proposed images or clips matching the desired criteria may be presented to a user. The user may then select which clips or images he or she believes best represent the piece of content. By using the scene and shot detection and categorization, the user does not have to view the entire piece of content to look for clips or images with the desired characteristics.

Another use for the scene and shot detection and categorization techniques described herein is for content production. For example, a content producer may record many hours of footage, then edit the recorded footage into a final product that includes only a fraction of recorded footage. Sifting through all of the available footage to identify and select the portions of recorded content to be included in the final product can be onerous. Additionally, when editing such footage, it may be desirable to go through all the scenes having certain characteristics to make a certain type of adjustment to such scenes. By using the categorized shots and scenes, a content producer may quickly find, view, and edit specific types of content. A content producer may also quickly find certain scenes and shots that should not be included in the final product so as to avoid further editing of such scenes.

FIG. 1 is a block diagram of a representational feature detection and categorization process. According to the present example, a video item 102 is analyzed by a detection and categorization module 104. The detection and categorization module 104 identifies various representational features within the video item 102. Representational features may include video clips 106a and still images 106b from the video item 102. Clips 106a may correspond to shots or portions of shots within the video item 102. Still images 106b may correspond to specific frames within the video item 102. The detection and categorization module 104 may also assign clip metadata 108a and image metadata 108b (collectively, referred to as metadata 108) to the shots 106a and frames 106b. The clips 106a and images 106b as well as their respective metadata 108a, 108b may be used by the representational content creation module 112 to create one or more representational items, such as exemplary representational items 124a, 124b. A representational item may be, for example, a trailer or a slideshow of images. The metadata 108 is described in additional detail below.

The video item 102 may be a piece of video content that may be streamed over a network such as the Internet. The video item may be, for example, a full-length movie, a television series or film series, an individual episode of a series, or a portion of a movie or episode. Other types of video content are also contemplated. The video item 102 may be encoded in a machine-readable format. In some embodiments, the video item 102 may be encoded in a format that is suited for storage, but not for streaming. In other embodiments, the format in which the video item is received may be suited for storage and/or streaming. More specifically, the video item 102 may include a set of data that specifies a series of frames, each frame including an image. When the frames are displayed in sequence, they produce a video. The video item 102 may be encoded using various technologies that compress the data. The data that comprises the video item 102 may also include audio data that accompanies the video.

The detection and categorization module 104 includes the hardware, software, or combination of both to analyze the data of a video item 102 and identify different shots and frames within the video item 102. For example, the detection and categorization module 104 may indicate the starting point and stopping point for each different shot within the video item 102. For example, during a sequence with back and forth dialogue between two characters, a shot may be a portion of the video item 102 that shows one character talking. A subsequent shot may show another character responding. The detection and categorization module 104 may also identify a selection of frames within the video item 102. The detection and categorization module 104 may also analyze the shots and divide them into a number of clips. The detection and categorization module 104 may also analyze the images associated with each of the frames to detect various features within the frames. Such features may include, for example the face of individual characters appearing in the shot or frame. Based on such features, the detection and categorization module 104 may assign metadata to the various clips 106a and images 106b detected within the video item 102.

A frame 106b corresponds to a still image that when combined with other frames in sequence produces a motion picture. The data that forms the video item 102 may describe each frame within the video item 102 or may describe only some of the frames, with interstitial frames being interpolation using various techniques. The detection and categorization module 104 may analyze a plurality of frames within the video item 102 and assign metadata to each of those frames based on features detected within those frames. Image metadata 108b will be described in further detail below.

A series of frames may form a shot. A shot may generally represent a portion of the video that includes one continuous camera roll. A shot may also generally represent continuous footage between two edits or cuts. The detection and categorization module 104 may detect shots in a variety of ways. In one example, the features within each frame are analyzed. Such features may include the coloring of the frame, the brightness of the frame, or machine-identifiable features such as shapes and edges. If a particular frame is substantially different than the previous frame, then it may be determined that a cut has occurred. In other words, the previous shot has ended and a new shot has started.

In some examples, the shots may be divided into separate clips 106a. Some shots may be too long to be included in a representational item. Thus, it may be desirable to analyze portions of shots (e.g., clips) separately. A shot may be divided into different clips in a variety of manners. In one example, a shot may be divided into different clips based on time. For example, the detection and categorization module 104 may be configured to limit clips to 3 seconds. Thus, a 30 second shot may be divided into ten different clips, each about 3 seconds long. Alternatively, the clip length limit may be 5 seconds. Thus, the 30 second shot may be divided into 6 different clips. In some examples, the clips may be separated based on analysis of the audio data for the video item 102. For example, a particular shot may include multiple characters taking turns speaking. The shot may be divided based on which character is speaking, or based on whether or not any character is speaking, during a particular time frame. As another example, the shot may be accompanied by music that includes long minor chords, suggesting dramatic tension. Alternatively, accompanying music may suddenly get louder after a character speaks, suggesting that the character's statement is dramatically important.

In some examples, the clips 106a within the shot may be ranked by activity detected within the clips. For example, if it is determined that there are lots of color changes in a particular clip, thus indicating that more exciting things may be happening within the clip. Thus, a value may be assigned indicating the "excitement" of each particular clip within the shot. As another example, a color signature associated with explosions may be used to identify clips that are likely to include an explosion.

After the shots and clips 106a have been identified in the video item 102, the detection and characterization module 104 may identify differences between the features of different frames within the clips 106a. These differences may be used to categorize the clip 106a and assign various metadata to the clip 106a. Clip metadata 108a and categorization will be described in further detail below.

The detected clips 106a and images 106b and their respective metadata are used by the representational content creation module 112 to produce representational items 124a, 124b, collectively referred to as representational items 124. The representational content creation module 112 includes the hardware, software, or combination of both to analyze the identified candidate representational features (i.e., clips 106a and images 106b) from a video item 102 and combine a subset of those representational features to produce one or more representational items 124. To produce a representational item 124a, 124b, the representational content creation module 112 receives a set of criteria 110 that identifies characteristics of clips and images that should be identified in the clips 106a and images 106b for inclusion in the representational items 124a, 124b.

Various pieces of criteria 110 may be provided to the representational content creation module 112. For example, the criteria 110 may specify that a particular representational item 124a, 124b have a set number of close-up shots of the most popular characters in the video item. The criteria may also specify that there be at least one establishing shot within the representational item 124a, 124b. The criteria 110 may also specify that the clips should have specific levels of brightness, sharpness, saliency, a character with both eyes open, or follow the rule-of-thirds or other photographic or videographic conventions. The criteria 110 may specify an order in which matching clips should be arranged within the representational item 124a, 124b. In some examples, the criteria 110 may be provided by a user 114. For example, a user may wish to create a particular type of representational item 124a, 124b and thus specify criteria that will find clips and/or frames matching those criteria. In some examples, the criteria 110 may be a predefined, general set of criteria.

In some examples, the criteria 110 may be selected so as to create a representational item 124 that includes clips 106a without any still images 106b. For example, such a representational item 124 may be similar to a trailer for a particular movie or episode. In some cases, the criteria 110 may be selected so as to create a representational item 124 that includes still images 106b without any clips 106a or that includes a single still image. For example, such a representational item 124a, 124b may be for use in an Internet-based streaming service. When a user selects a particular video item, the user may be presented with a representational item that includes a series of still images from the selected piece of content. In some examples, a representational item 124 may include both clips 106a and images 106b.

In some examples, the criteria 110 may specify clips that may be used without audio. For example, some clips 106a may present the desired content without the audio. Other clips may require audio for a consumer to understand what is happening within the clip. For example, a clip of a character speaking would likely need audio for it to have representational value. Other clips in which a character is performing an action without any dialogue may be usable in a representational item 124a, 124b that does not include audio. Accordingly, the representational item 124a may include portions that have dialogue and show dialogue (e.g., show the mouths of actors moving) while the representational item 124b may include only portions that neither have dialogue nor show dialogue. On a platform, such as a social network, in which videos are displayed by default without audio, the representational item 124b may be preferable to the representational item 124a.

The representational content creation module 112 may creation representational items 124a, 124b in a variety of ways. In one example, the representational content creation module may use an automated representational content creation component 122 to automatically create a representational item without direction by the user 114. For example, the automated representational content creation component 122 may take the criteria 110, analyze the set of clips 106a from the video item 102, compile a subset of clips 106a that match the criteria 110, and combine the subset of clips 106a to create the representational item 124b. The subset of clips 106a may be combined in the order in which they occur in the video item 102, or the subset of clips 106a may be combined in an order provided or determined by criteria 110. In some examples, the representational item 124b may also include still images from a set of images 106b that match the criteria 110.

In one example, the user directed representational content creation component 120 may analyze the representational features of a video item and compile a subset of representational features 116 that match the criteria 110. A list of the subset of representational features 116 may then be provided to the user 114 through a user interface. The user 114 may then select which of the provided representational features he or she would like to include in the representational item 124a. The user 114 may also select a sequence or order in which the representational features 116 are to appear in the representational item 124a. A list of the selected representational features 118 may then be provided to the representational content creation module 112. The user directed representational content creation component 120 may then use the selected representational features to automatically create the representational item 124a. Alternatively, the user may direct the representational content creation module 112 as to the manner in which the selected representational features 118 should be combined to create the representational item 124a.

Figure 2:
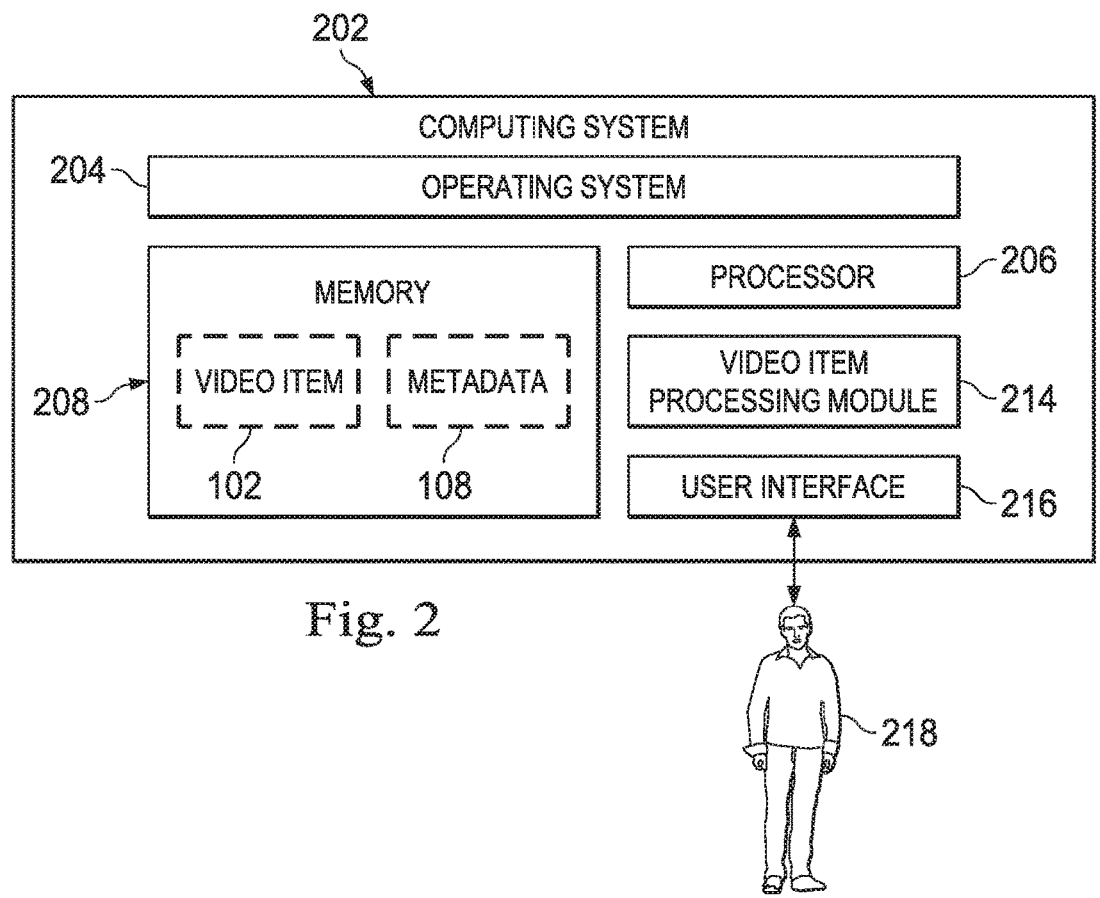
FIG. 2 is a diagram showing an illustrative computing system that may perform representational feature detection and categorization, according to some embodiments of the present disclosure.

FIG. 2 is a diagram showing an illustrative computing system 202 that may perform shot detection and categorization as well as promotional item creation. According to the present example, the computing system 202 includes a processor 206 and a memory 208. The processor 206 may include one or more individual processors or processing cores. Similarly, the memory 208 may include one or more memory devices of different types. The computing system 202 also includes a video item processing module 214 and a user interface. The memory 208 may include machine readable instructions for execution on the processor 206. Such instructions may be associated with various applications as well as an operating system 204.

In some examples, the computing system 202 may be a desktop, laptop, or tablet computing device. In some examples, the computing system may be a server. Exemplary servers may include, for example, stand-alone and enterprise-class servers operating a server operating system (OS) such as a MICROSOFT® OS, a UNIX® OS, a LINUX® OS, or another suitable server-based operating system 204. It should be appreciated that the computing system 202, illustrated in FIG. 1, may be deployed in other ways and that the operations performed and/or the services provided by such servers may be combined or separated for a given implementation and may be performed by a greater number or fewer number of individual computing devices.

For example, the computing system 202 may comprise a client computing device in communication with one or more server computing devices over a network. The computing system 202 may be owned, operated, or otherwise controlled by a streaming content service provider.

As noted, the memory 208 may include a plurality of memory modules. The memory modules may be of varying types. Some of the memory 208 may be volatile memory such as Random Access Memory (RAM). Some of the memory 208 may be non-volatile memory such as hard disk drives or SSDs. In addition to storing machine-readable instructions that form applications, the memory 208 may store video items 102 for analysis. The memory 208 may also store the results of such analysis such as the metadata 108 for various shots and/or frames of the video items 102. The memory 208 may also store representational items created for the video items 102.

The video item processing module 214 includes hardware, software, or combination of both to analyze video items and produce representational content therefrom. For example, the video item processing module 214 may include or provide the shot detection and categorization module 104 described above. The video item processing module 214 may also include or provide the representational content creation module 112 described above.

The user interface 216 includes the hardware and software to allow a user 218 to interact with the computing system. The user interface 216 may include user input devices such as a keyboard or a mouse. The user interface 216 may also include user output devices such as a display screen. The user interface 216 may be located or provided remotely from other components of the computing system 202.

Figure 3:
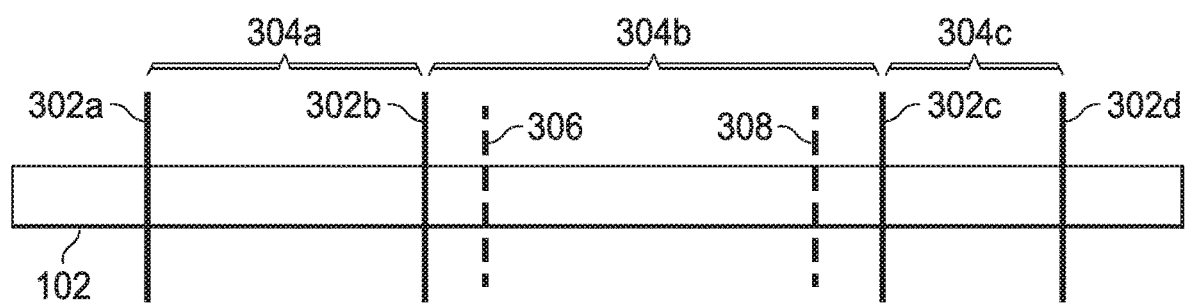
FIG. 3 is a diagram representing shots and frames within a video item, according to some embodiments of the present disclosure.

FIG. 3 is a diagram representing a video item 102, which includes a sequence of frames presented over time. The video item 102 includes clips 304 (sequences of frames) and individual frames 306, 308. FIG. 3 illustrates three different clips 304a, 304b, 304c within the video item 102. These clips may be in the same shot or may span different shots. The clips 304a, 304b, 304c are separated by cuts 302, which may be represented as timestamps or other frame identifiers. Specifically, clip 304a extends between cut 302a and cut 302b. Clip 304b extends between cut 302b and cut 302c. Clip 304c extends between cut 302c and cut 302d. In one example, the shot detection and categorization module 104 may detect cuts 302 within the video item 102. Then, the shot detection and categorization module 104 may define the clips as between the first frame after the cut and the last frame before the subsequent cut.

The detection and categorization module 104 also analyzes each clip in order to assign metadata, including one or more clip categories, to that clip. This may be done by analyzing the machine-readable data that represents frames within the clip 304. In one example, the detection and categorization module 104 selects two frames 306, 308 within a particular clip 304b. In some embodiments, more than two frames from a clip may be analyzed pairwise, in order to assign metadata, including one or more clip categories, to that clip. The detection and categorization module 104 may analyze the features found within the first frame 306 and analyze the features found within the second frame 308. Such features may include faces or items, and may also include edges or colors that can be identified by computer image processing algorithms. The detection and categorization module 104 may then determine the differences between the features of those frames 306, 308. If, for example, the spatial relationships between various features of the second frame 308 are larger than the spatial relationships between various features of the first frame 306, it may be determined that the clip is a zoom-out shot. If, for example, the features of the first frame 306 are determined to be those of a character's face, and the features of the second frame 308 are also determined to be those of the character's face, and the character's face occupies a certain percentage of the frame, it may be determined that the clip 304b is a close-up shot. If, for example, it is determined that the features of the second frame 308 have shifted with respect to the features and the first frame 306 in a particular manner such as by panning or by other movement indicative of a change in the angle of the camera used to capture the frames, the module 104 may determine that the clip 304b is an establishing shot. Other types of clips, and the methods for identifying such clips, are contemplated as well. Categories of shots may include any categories or descriptors used in the production and editing of film and television to identify shots or scenes.

The detection and categorization module 104 may also analyze a select number of frames within the video item 102. Analyzing the frames within the video item 102 involves examining the machine-readable data that forms the video item 102. In some examples, every single frame of the video item may be analyzed. For example, the video item 102 may be analyzed during an encoding process in which the video item 102 is changed from one format to another format, such as a compressed format. In some examples, however, every X number of frames may be analyzed. In some examples, X may be within a range of about 5 to 60. Other values for X are contemplated as well. The detection categorization module 104 may also assign metadata to each frame analyzed. Clips may be assembled based on the metadata associated with each frame.

FIGS. 4A and 4B are tables showing various metadata that may be assigned to detected clips and images within frames. FIG. 4A shows an illustrative table 400 that includes metadata for a particular frame, also referred to as frame metadata, like the image metadata 108b of FIG. 1. The metadata may indicate the visual properties 401 of the frame, the structural properties 403 of the frame, and the temporal properties 405 of the frame. Exemplary visual properties 401 may include brightness 402, sharpness 404, and contrast 406. Other visual properties may include the color composition of the frame or color temperature. Exemplary structural properties 403 include identified faces 408 and frame saliency 410. Exemplary temporal properties 405 include frame motion 412 and frame direction 414.

Visual properties 401 may be determined from an analysis of the image content of a frame in one or more color spaces, including the RGB (red, green, blue) color space, chrominance-luminance color space, or hue-saturation-luminance color space. The detection and categorization module 104 may assign a brightness value 402 to a frame based on the average brightness value of each pixel within the frame. Specifically, the detection and categorization module 104 examines the data that represents the frame. That data may define color values for each pixel within the frame. For example, if the data for the pixel is represented in the RGB color space, then the brightness for a particular pixel may be defined as the average color value for the pixel (e.g., $Br=(R+G+B)/3$, where Br is the brightness, R is the red color value, G is the green color value, and B is the blue color value). Other manners of determining a brightness value, such as based on luminance values, are also contemplated.

The detection and categorization module 104 may assign a sharpness value 404 and a contrast value 406 to the frame based on an analysis of the data that defines the frame. For example, the detection and categorization module 104 may apply a function to determine a sharpness value and a contrast value of the frame. Sharpness, sometimes referred to as acutance, is a measure of how strongly the contrast of an image is perceived. Contrast refers to the color differences within the image. Various methods of determining a sharpness value and a contrast value based on the data that represents the frame may be used.

The detection and categorization module 104 may also identify faces 408 that appear within the clip. For example, it may be determined based on an analysis of features within the frame that the frame includes one or more faces. Various facial recognition functions may be applied to identify the presence of the faces and then identify the actual faces represented in the data. The faces of the various characters within the frame may also be assigned a popularity value. This popularity value may be derived in a variety of manners. In one example, the popularity value is based on a percentage of time in which that character appears within the video item. In some examples, external sources may be used to determine the popularity of the character. For example, a popularity value may be predefined by a human user. In some examples, an analysis of publicly or privately available information such as webpages, social media, a movie or actor information database, or other video items offered by a streaming content service provider may be applied in order to assign a popularity value to a particular character. The detection and categorization module 104 may identify the faces included in the data and find the corresponding popularity value in a database.

The detection and categorization module 104 may assign saliency data to a frame. The saliency data may include, for example, a saliency map. A saliency map identifies the uniqueness of portions of an image. For example, the color uniqueness of a portion (e.g., pixel or set of adjacent pixels) of an image may be identified with a value. A saliency map may also include a saliency value assigned to the person or object of focus (e.g., the portion that is in proper camera focus) within the image. For example, the saliency value may identify how much that person or object stands out with respect to the background (e.g., the portion that is out-of-focus) in which that object or person is placed. In some embodiments, the saliency map may also incorporate information about the relative brightness, sharpness, or color of the person or object of focus relative to the background.

The detection and categorization module 104 may also determine temporal features of the frame. For example, by analyzing the data representing the frame, and adjacent frames, it can be determined that a particular object or person of focus is moving at a particular speed and direction relative to other objects or the background of the image. This information can be determined to assign a frame motion value 412 and a frame direction value 414. In some embodiments, the frame direction value 414 may indicate a panning motion, a zooming motion, or both, of the camera. For example, when objects in the frames are moving together as a group, the frame direction value 414 may indicate a panning motion. When objects in the frames are moving closer together or farther apart, or when the objects are changing size, the frame direction value 414 may indicate a zooming motion. When certain objects in the frames are moving while other objects are not moving, the frame direction value 414 may indicate that the camera is not moving.

FIG. 4B shows an illustrative table 420 that includes metadata for a particular clip, also referred to as clip metadata, like the clip metadata 108a of FIG. 1. According to the present example, the metadata may include a clip category 422, visual properties 424, structural properties 426, and temporal properties 428.

The clip category 422 identifies the type of clip. For example, clip categories may include, but are not limited to, a close-up shot, an establishing shot, a zoom-out shot, or another category of shots utilized in the television and film industries. Other types of clip categories may be defined as well. As described above, a clip categorization may be done by analyzing at least two different frames within the clip. Based on differences between features within those two frames, a clip category may be assigned.

The visual properties data 424 may include information such as brightness, sharpness and contrast. These may be represented as average values for the clip. For example, a sample of frames from the clip may be analyzed and averaged to determine various visual property values.

The structural properties data 426 may include structural features of the clip such as which characters appearing in the video item 102 appear within the clip. The temporal properties data 428 may indicate the direction, if any, in which the clip or an object in the clip is moving. The temporal properties data 428 may also indicate the direction any objects of focus are moving with respect to the background. Other pieces of information that may be helpful for selecting content for representational items may be included with the clip metadata.

FIG. 5 is a diagram showing detection of features indicating a close-up shot. FIG. 5 illustrates an image of two different frames 502, 504. In the present example, the first frame 502 corresponds to an earlier frame within the clip and the second frame 504 corresponds to a later frame within the clip. The frames 502, 504 are analyzed to identify certain features within each frame 502, 504. In some examples, the features may be identified as primary features and secondary feature. In the present example, the frames 502, 504 have a primary feature 506a, 506b which is the face of a single character appearing within the clip. Additionally, the frames 502, 504 include secondary features 508a, 508b, such as a portion of the character's clothing (in this example, the character's tie).

In some examples, various functions may be applied to identify primary features and secondary features. In general, faces of characters may be designated as primary features. Other objects that stand out with respect to the rest of the background may be designated as secondary features. If there are no faces within a clip, then other mechanisms can be used to identify a primary feature. For example, the object that stands out the most may be designated as the primary feature. Alternatively, no primary feature may be identified and only secondary features may be identified. In some examples, there may be no distinction made between primary and secondary features.

The clip category may be assigned by comparing the features between the two frames. In the example of FIG. 5, a comparison of the primary feature 506a from the first frame 502 with the corresponding primary feature 506b from the second frame 504 shows that there is little difference in size or position of the primary feature 506. The trace lines between the features are substantially parallel and horizontal. This indicates that there is little motion between the first frame 502 and the second frame 504. Additionally, the comparison between the secondary feature 508a from the first frame 502 and the corresponding secondary feature 508b from the second frame 504 shows that there is little difference in position of the secondary feature 508. Additionally, the primary feature 506 takes up a certain amount of space within the frame. For example, the primary feature 506 may have overall dimensions that include at least one dimension that is greater than one third of the corresponding dimension of the overall frame. For example, the face identified as the primary features 506a, 506b has a height that is greater than one third of the overall height of the frame. The threshold value of one third is provided by way of example; other values or percentages may be used in other embodiments. Based on this information, it may be determined that the clip is a close-up shot. Thus, the clip may be categorized accordingly.

Figure 6:
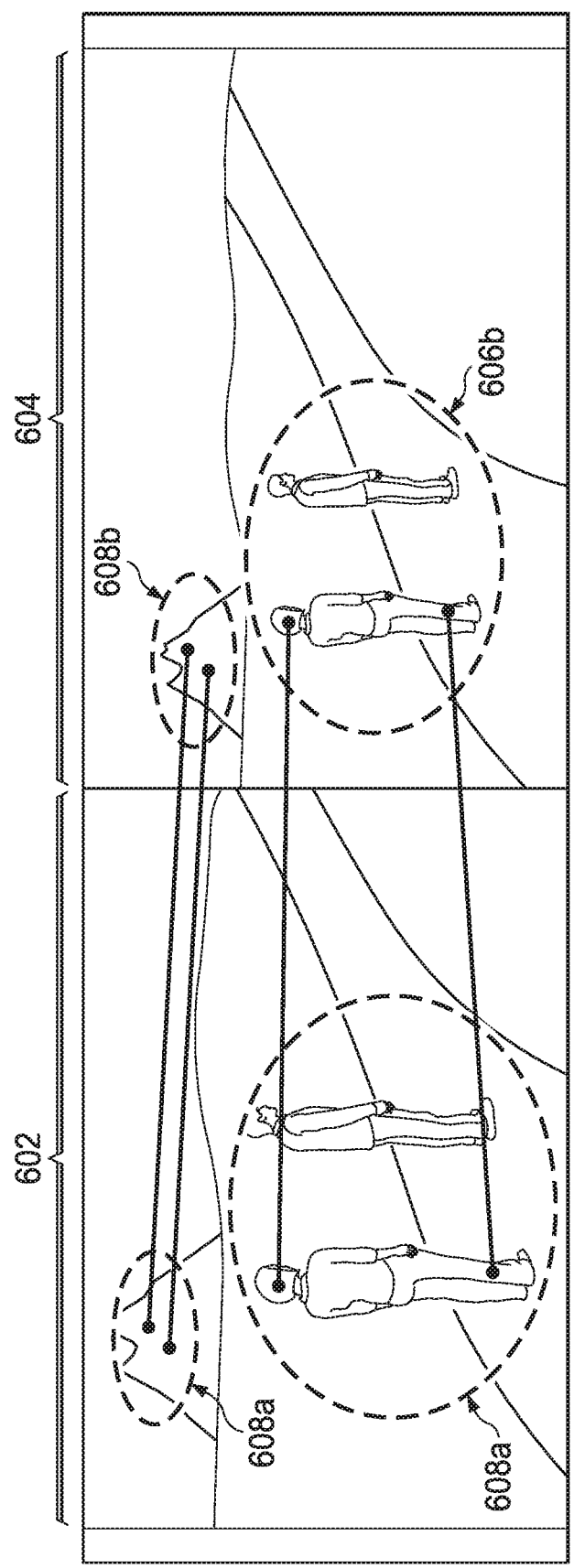
FIG. 6 is a diagram showing detection of features indicating an establishing shot, according to some embodiments of the present disclosure.

FIG. 6 is a diagram showing detection of features indicating an establishing shot. FIG. 6 illustrates images of two different frames 602, 604. The primary features 606a, 606b detected within the frames are people and the secondary features 608a, 608b detected within the frames 602, 604 include scenery. The clip category may be assigned by comparing the features between the two frames 602, 604. A comparison of the relation between the primary feature 606a and the secondary feature 608a of the first frame with the relation between the primary feature 606b and the secondary feature 608b of the second frame 604 shows that the distance between the two changes and that one relative dimensions (for example, height) of the identified features changes while another dimension (for example, width) does not change or does not change as much. This may indicate that the shot includes movement of the camera relative to the identified features. In other words, the trace lines between corresponding points within the frames are not completely horizontal but are instead slightly diagonal. The relatively shallow slope of the lines indicates that while there is some motion between the two frames 502, 504, it is not a sudden or quick motion. Additionally, the primary features 606a (i.e., the people) take up a relatively small amount of space compared to the image. Based on this information, the detection and categorization module 104 may be determined that the clip is an establishing shot. Thus, the clip may be categorized accordingly.

Figure 7:
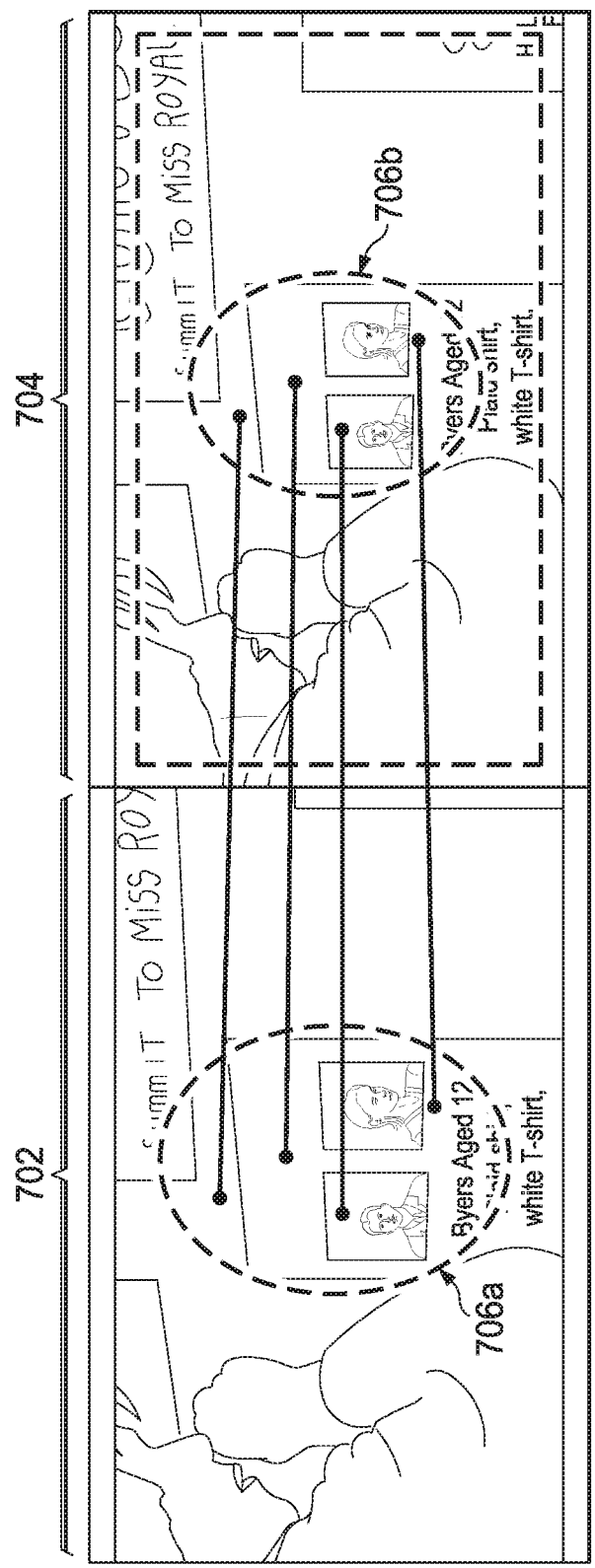
FIG. 7 is a diagram showing detection of features indicating a zoom-out shot, according to some embodiments of the present disclosure.

FIG. 7 is a diagram showing detection of features indicating a zoom-out shot. FIG. 7 illustrates images of two different frames 702, 704. The features 706a, 706b detected within the frames include an object of focus at which the character is looking. The clip category may be assigned by comparing the features between the two frames 702, 704. A comparison of the relative size of the features 706a in the first frame and the relative size of the features 706b in the second frame 704 shows that the relative size changes. Specifically, the features 706b within the second frame 704 are smaller than the corresponding features 706a of the first frame 702. The converging nature of the trace lines between corresponding points suggests that the corresponding features are smaller in the second frame 704 than they are in the first frame 702. Based on this information, it may be determined that the clip is a zoom-out shot. Thus, the clip may be categorized accordingly. If it had been determined that the features 706b within the second frame 704 were larger than the corresponding features 706a of the first frame 702, then it may have been determined that the clip is a zoom-in shot.

FIGS. 5-7 illustrate a few examples of detecting features within clips to assign a clip category to such clips. Other types of clips may be detected as well. Additionally, other types of functions for identifying different types of clips may be used in embodiments of the detection and categorization module 104.

FIG. 8 is a flowchart showing an illustrative method 800 for representational feature detection and categorization. The method 800 includes several enumerated steps or operations. Embodiments of the method 800 may include additional steps before, after, in between, or as part of the enumerated steps. Some embodiments may omit one or more of the enumerated operations. Additionally, some embodiments of the method 800 include non-transitory machine-readable media having instructions stored thereon that cause a processor to perform all or some of the described operations. Some common forms of machine readable media that may include the processes operations of method 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

According to the present example, the method 800 includes an operation 802 of receiving a video item or extracting or reading data that comprises the video item. For example, a video item may be stored on a computing system that also includes a detection and categorization module. The video item may be a full-length movie, and episode of a series, or any other type of video content. The video item may be represented by machine readable data encoded in a format that is ideal for storage and/or streaming. The machine readable data defines a series of frames that when played in series produces a video.

The method 800 further includes an operation 804 of identifying a first set of features within a first frame of the video item. The first frame may be within a designated clip. The first frame may not necessarily be the first frame of the clip. In some embodiments, a preliminary operation may identify scene changes, and these scene changes may be used to identify candidate clips for analysis. In some examples, the first frame may be within a predefined number of frames from the first frame of the clip. Various functions may be applied to the machine-readable data of the video item to identify various features, such as character faces or other objects, within the first frame.

The method 800 further includes an operation 806 for identifying a second set of features within a second frame of the video item, the second frame being subsequent to the first frame. The second frame may be within the designated clip as well. The second frame may not necessarily be the last frame within the clip. In some examples, the second frame may be within a predefined number of frames from the last frame of the clip. Again, various functions may be applied to the machine-readable data of the video item to identify various features within the second frame.

The method 800 further includes an operation 808 for determining differences between the first set of features and the second set of features. Such differences may include, for example, changes in relationships between the features, size changes relative to the size of the frame, color changes, and other differences that may help categorize the clip. Changes in size, relationships between the features, and the positions of the features may indicate the motion occurring within the clip between the two frames.

The method 800 further includes an operation 810 for, based on the differences, assigning a clip category to a clip extending between the first frame and the second frame. In some examples, the clip may extend beyond the first frame and/or the second frame. The clip category may be used in the creation of representational items. For example, embodiments of the method 800 may utilize a representational content creation module. The representational content creation module may query a database of clips and frames that match a set of criteria. The results of that query may then be combined to produce one or more representational items. Some embodiments may produce a single representational item from a single video item. Other embodiments may items the item. For example, the representational content creation module may generate a first representational item that includes dialogue or other important audio, a second representational item that does not include any or more than a threshold amount of dialogue, and a third representational item that is a still frame image. Some embodiments of the method 800 may include an automatic operation of generating one or more representational items without user involvement. In some embodiments, a user may thereafter screen the automatically generated representational items and provide an input to select from among the representational items.

Embodiments of the presently disclosed systems and methods described herein permit representational items to be created while utilizing fewer resources. Specifically, representational items having defined criteria can quickly and efficiently be compiled. Because embodiments of the present disclosure rely on computer-based image processing rather than a human to categorize aspects of received video items, the present disclosure may enable the creation of representational items more consistently, more efficiently, and without relying on human observations. Additionally, some embodiments of the present disclosure may be performed in conjunction with a formatting operation that converts the video item from one format to another, such that the detection and characterization is performed in parallel with the encoding.

Modifications to aspects of the present disclosure that are apparent to one of ordinary skill in the art are included within the scope of this disclosure. Accordingly, certain aspects of the present disclosure are set out the following numbered clauses:

1. A method comprising: receiving, with a computing system, a video item; identifying a first set of features within a first frame of the video item; identifying, with the computing system, a second set of features within a second frame of the video item, the second frame being subsequent to the first frame; determining, with the computing system, differences between the first set of features and the second set of features; and assigning a clip category to a clip extending between the first frame and the second frame based on the differences.

2. The method of clause 1, further comprising associating image metadata with an image from a particular frame within the video item, the image metadata comprising at least one of: saliency, brightness, sharpness, character popularity, and rule of thirds.

3. The method of any of clauses 1-2, further comprising associating clip metadata with the clip, the clip metadata including at least the clip category.

4. The method of any of clauses 1-3, wherein the clip category includes one of: an establishing shot, a zoom-in shot, a zoom-out shot, and a close-up shot.

5. The method of any of clauses 1-4, further comprising identifying additional clips within the video item, each of the additional clips being categorized based on feature differences between frames within the additional clips.

6. The method of clause 5, further comprising receiving criteria for clips within the video item.

7. The method of clause 6, wherein the criteria is provided through a user interface.

8. The method of any of clauses 5-7, further comprising determining a subset of clips from the clip and the additional clips, the subset of clips matching the criteria.

9. The method of clause 8, further comprising combining the subset of clips to create a representational item.

10. The method of any of clauses 8-9, further comprising providing the subset of clips to a user interface.

11. The method of clause 10, further comprising receiving from the user, a set of selected clips, the selected clips being selected from the subset of clips.

12. The method of clause 11, further comprising combining the selected clips to create a representational item.

13. A method comprising: identifying, with a computing system, a set of clips from a video item, each clip having a first frame and a second frame subsequent to the first frame; assigning, with a computing system, clip metadata to each of the clips within the set of clips based on features detected within frames of the clip and feature differences between first and second frames within each clip; receiving a set of criteria; and determining a subset of clips from the set of clips, clips within the subset of clips having metadata that matches the set of criteria.

14. The method of clause 13, further comprising combining the clips within the subset of clips to create a representational item.

15. The method of any of clauses 13-14, wherein the metadata includes a clip category for a particular clip within the set of clips based on the feature differences between the first frame and the second frame of the particular clip.

16. The method of any of clauses 13-15, wherein the metadata includes a popularity value for at least one character within the clip.

17. The method of clause 16, wherein the popularity value is based on a percentage of frames within the video item in which the at least one character appears.

18. A streaming media system comprising: a processor; and a memory comprising machine readable instructions that, when executed by the processor, cause the system to: receive a video item, the video item comprising a set of frames; identify a plurality of representational features within the video item, the representational features including clips and frames; for a particular clip, determine differences between a first set of features of a first frame of the particular clip and a second set of features of a second frame of the particular clip; and assign a clip category the particular clip based on the differences.

19. The system of clause 18, wherein the system is further to assign image metadata to images of frames identified within the video item, the image metadata identifying at least one of: saliency, brightness, sharpness, character popularity, and rule of thirds.

20. The system of any of clauses 18-19, further comprising: receiving from a user a set of criteria for clips and frames; and presenting to the user a set of frames and clips that match the criteria.

What is claimed is:
1. A method comprising:
receiving, with a computing system, a video item and an indication of one or more criteria identifying a plurality of clip category types and an ordering for video clips that match each clip category type;
identifying one or more primary features and one or more secondary features within a first frame of the video item;

identifying, with the computing system, the primary and secondary features within a second frame of the video item, the second frame being subsequent to the first frame;

determining, with the computing system, differences between the primary and secondary features of the first frame and the primary and secondary features of the second frame;

assigning a clip category to a clip extending between the first frame and the second frame based on the differences; and automatically generating a representational item comprising a plurality of clips in a specified order, wherein each clip is ordered within the representation item according to the received criteria.

2. The method of claim 1, further comprising associating image metadata with an image from a particular frame within the video item, the image metadata comprising at least one of: saliency, brightness, sharpness, character popularity, and rule of thirds.

3. The method of claim 1, further comprising associating clip metadata with the clip, the clip metadata including at least the clip category.

4. The method of claim 1, wherein the clip category includes one of: an establishing shot, a zoom-in shot, a zoom-out shot, and a close-up shot.

5. The method of claim 1, further comprising identifying additional clips within the video item, each of the additional clips being categorized based on feature differences between frames within the additional clips.

6. The method of claim 5, further comprising receiving criteria for clips within the video item.

7. The method of claim 6, wherein the criteria is provided through a user interface.

8. The method of claim 5, further comprising determining a subset of clips from the clip and the additional clips, the subset of clips matching the criteria.

9. The method of claim 8, further comprising combining the subset of clips to create a representational item.

10. The method of claim 8, further comprising providing the subset of clips to a user interface.

11. The method of claim 10, further comprising receiving from the user, a set of selected clips, the selected clips being selected from the subset of clips.

12. The method of claim 11, further comprising combining the selected clips to create a representational item.

13. A method comprising:

identifying, with a computing system, a set of clips from a video item, each clip having a first frame and a second frame subsequent to the first frame;

assigning, with a computing system, clip metadata to each of the clips within the set of clips based on one or more primary features and one or more secondary features detected within frames of the clip, and feature differences between the primary and secondary features of the first frame and the primary and secondary features of the second frames within each clip;

receiving a set of criteria identifying a plurality of clip category types and an ordering for video clips that match each clip category type;

determining a subset of clips from the set of clips, clips within the subset of clips having metadata that matches the set of criteria; and automatically generating a representational item comprising the determined subset of clips in a specified order, wherein each clip is ordered within the representation item according to the received set of criteria.

14. The method of claim 13, further comprising combining the clips within the subset of clips to create a representational item.

15. The method of claim 13, wherein the metadata includes a clip category for a particular clip within the set of clips based on the feature differences between the first frame and the second frame of the particular clip.

16. The method of claim 13, wherein the metadata includes a popularity value for at least one character within the clip.

17. The method of claim 16, wherein the popularity value is based on a percentage of frames within the video item in which the at least one character appears.

18. A streaming media system comprising:

a processor; and a memory comprising machine readable instructions that, when executed by the processor, cause the system to:

receive a video item, the video item comprising a set of frames, and further receive an indication of one or more criteria identifying a plurality of clip category types and an ordering for video clips that match each clip category type;

identify a plurality of representational features within the video item including one or more primary features and one or more secondary features, the representational features including clips and frames;

for a particular clip, determine differences between the primary and secondary features of the first frame of the particular clip and the primary and secondary features of the second frame of the particular clip;

assign a clip category the particular clip based on the differences; and automatically generate a representational item comprising a plurality of clips in a specified order, wherein each clip is ordered within the representation item according to the received criteria.

19. The system of claim 18, wherein the system is further to assign image metadata to images of frames identified within the video item, the image metadata identifying at least one of: saliency, brightness, sharpness, character popularity, and rule of thirds.

20. The system of claim 18, further comprising:

receiving from a user a set of criteria for clips and frames; and presenting to the user a set of frames and clips that match the criteria.

* * * * *